(12) United States Patent
Lisch et al.

(10) Patent No.: US 10,780,625 B2
(45) Date of Patent: Sep. 22, 2020

(54) INVERTED CYLINDER ASSEMBLY FOR FORMING AND FILLING A CONTAINER WITH LIQUID

(71) Applicant: AMCOR RIGID PLASTICS USA, LLC, Wilmington, DE (US)

(72) Inventors: G. David Lisch, Jackson, MI (US); Kirk Edward Maki, Tecumseh, MI (US)

(73) Assignee: AMCOR RIGID PACKAGING USA, LLC, Wilmington, DE (US)

( * ) Notice: Subject to any disclaimer, the term of this patent is extended or adjusted under 35 U.S.C. 154(b) by 0 days.

(21) Appl. No.: 16/482,646

(22) PCT Filed: Jun. 20, 2017

(86) PCT No.: PCT/US2017/038331
§ 371 (c)(1),
(2) Date: Jul. 31, 2019

(87) PCT Pub. No.: WO2018/144055
PCT Pub. Date: Aug. 9, 2018

(65) Prior Publication Data
US 2020/0009780 A1 Jan. 9, 2020

Related U.S. Application Data

(60) Provisional application No. 62/453,293, filed on Feb. 1, 2017.

(51) Int. Cl.
*B29C 49/46* (2006.01)
*B29C 49/62* (2006.01)
(Continued)

(52) U.S. Cl.
CPC .............. *B29C 49/46* (2013.01); *B29C 49/62* (2013.01); *B29C 2049/4664* (2013.01); *B29K 2067/003* (2013.01); *B29L 2031/712* (2013.01)

(58) Field of Classification Search
CPC .. B29C 49/62; B29C 49/46; B29C 2049/4664
See application file for complete search history.

(56) References Cited

U.S. PATENT DOCUMENTS

| 7,842,226 B2 | 11/2010 | Polk, Jr. et al. |
| 2002/0139436 A1 | 10/2002 | Rosen et al. |

(Continued)

FOREIGN PATENT DOCUMENTS

| WO | WO-2014009249 A1 | 1/2014 | |
| WO | WO-2014209341 A1 | 12/2014 | |
| WO | WO-2018199940 A1 * | 11/2018 | ............. B65B 65/02 |

OTHER PUBLICATIONS

International Search Report and Written Opinion issued in PCT/US2017/038331, dated Aug. 31, 2017; ISA/KR.

*Primary Examiner* — Robert B Davis
(74) *Attorney, Agent, or Firm* — Harness, Dickey & Pierce, P.L.C.

(57) ABSTRACT

A liquid forming and filling system for filling a container with a liquid. The liquid forming and filling system having a motor, a gear box operably coupled to the motor configured to receive a driving output from the motor and outputting a gear box driving force, a linear screw operably coupled to the gear box configured to produce linear movement in response to rotational movement from the gear box, a forming cylinder configured to output pressurized liquid for forming and filling the container, the forming cylinder being in an inverted orientation, a top manifold plate and end cap vent valve assembly coupled to the forming cylinder for receiving the pressurize liquid, and a vent valve operably coupled to the top manifold plate and end cap vent valve assembly configured to vent air entrapped within the pressurized liquid.

19 Claims, 5 Drawing Sheets

(51) Int. Cl.
*B29K 67/00* (2006.01)
*B29L 31/00* (2006.01)

(56) References Cited

U.S. PATENT DOCUMENTS

2011/0094186 A1* 4/2011 Chauvin .............. B65B 3/022
53/396
2016/0107367 A1 4/2016 Maki et al.

* cited by examiner

INVERTED CYLINDER ASSEMBLY FOR FORMING AND FILLING A CONTAINER WITH LIQUID

CROSS-REFERENCE TO RELATED APPLICATIONS

This application is a U.S. National Phase Application under 35 U.S.C. 371 of International Application No. PCT/US2017/038331 filed on Jun. 20, 2017 which claims the benefit of priority of U.S. Provisional Application No. 62/453,293, filed on Feb. 1, 2017. The entire disclosures of the above applications are incorporated herein by reference.

FIELD

The present disclosure relates to liquid filling systems and, more particularly, relates to liquid filling systems having an inverted cylinder assembly for forming and filling a container with liquid.

BACKGROUND AND SUMMARY

This section provides background information related to the present disclosure which is not necessarily prior art. This section also provides a general summary of the disclosure, and is not a comprehensive disclosure of its full scope or all of its features.

Existing liquid fill systems for filling containers have been used for a number of years. However, it has been found that conventional systems suffer from a number of disadvantages. In some conventional system, air can be entrapped in the system. Air, being a compressible fluid, results in a "cushion" that prevents the fluid within the system from reaching full pressure. This reduction in pressure creates a situation where the container may not be fully filled and/or formed. The air has a propensity to coalesce into larger "bubbles" that cushion the operating pressures of the system, if not removed or flushed from the system. Conventional systems use a purge step and also a recirculation cycle that "sweeps" the entrapped air out of the cylinder.

The present teachings overcome the disadvantages of the prior art in a novel way. As will be understood from the following, the inversion of the main fill cylinder, in accordance with the principles of the present teachings, enables the entrapped air in the product to move into a vent area using the natural rising flow of air through liquid, which then can be removed using a valve to allow air to be released through the valve. A small amount of liquid product may also be released and possibly reused. Accordingly, the present teachings provide a system that eliminates or minimizes the need for this constant recirculating flow of liquid through the head.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
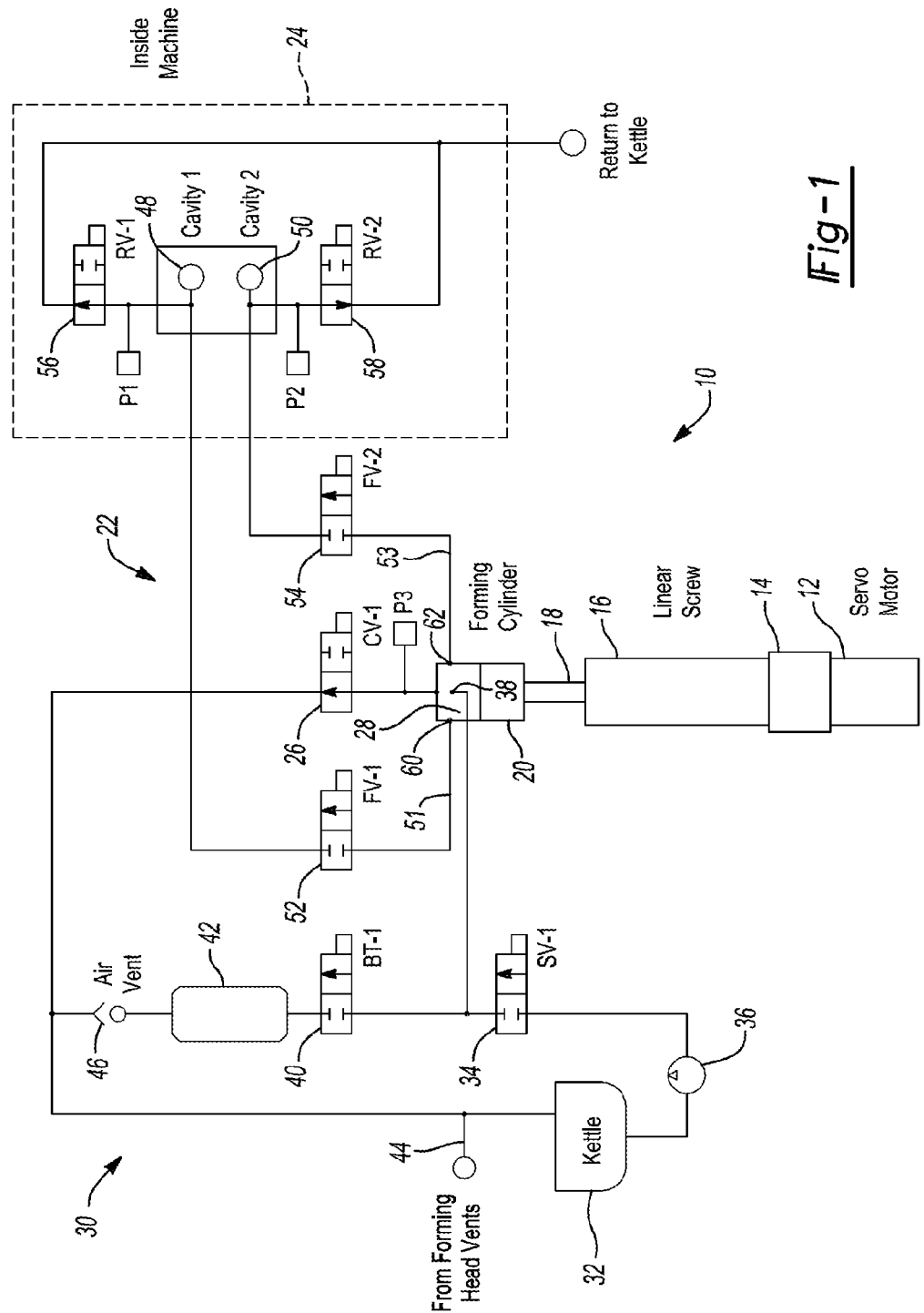
FIG. 1 illustrates a fluidic schematic of an inverted cylinder liquid forming and filling assembly according to the principles of the present teachings.
Figure 2:
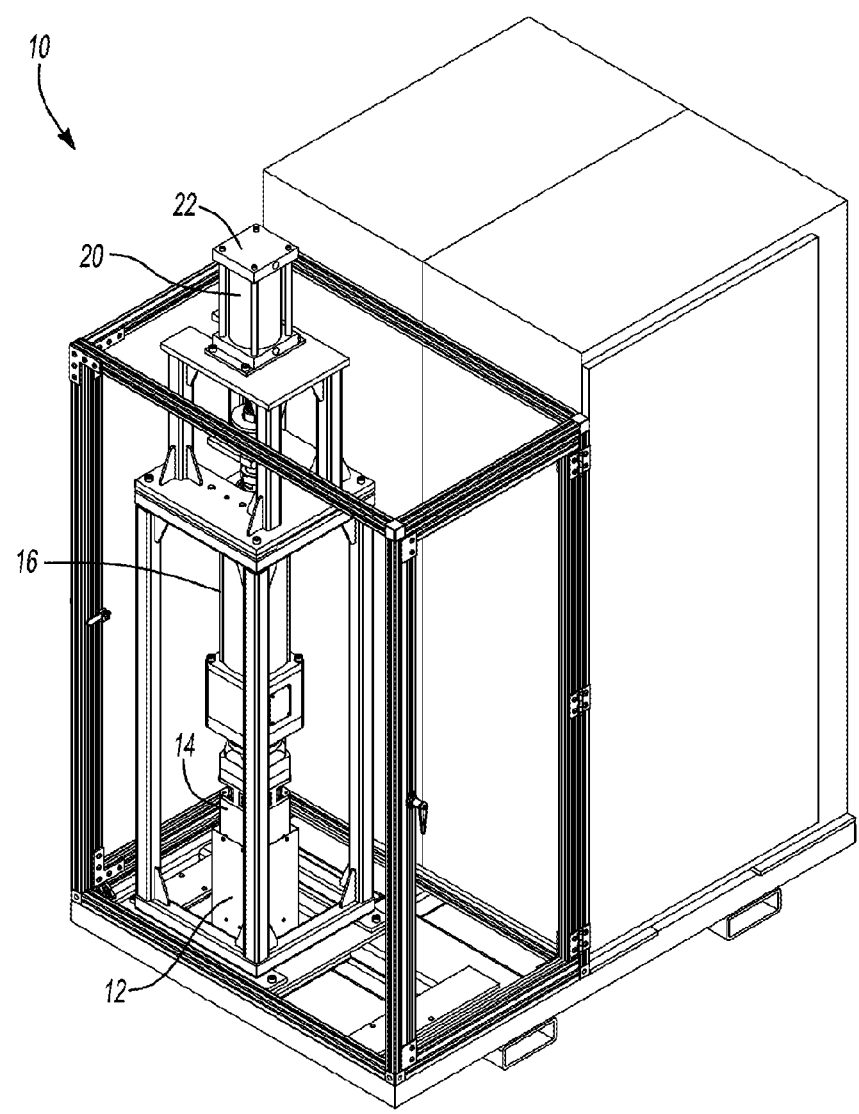
FIG. 2 is a perspective view of the inverted cylinder liquid forming and filling assembly according to the principles of the present teachings with portions removed for clarity.
Figure 3:
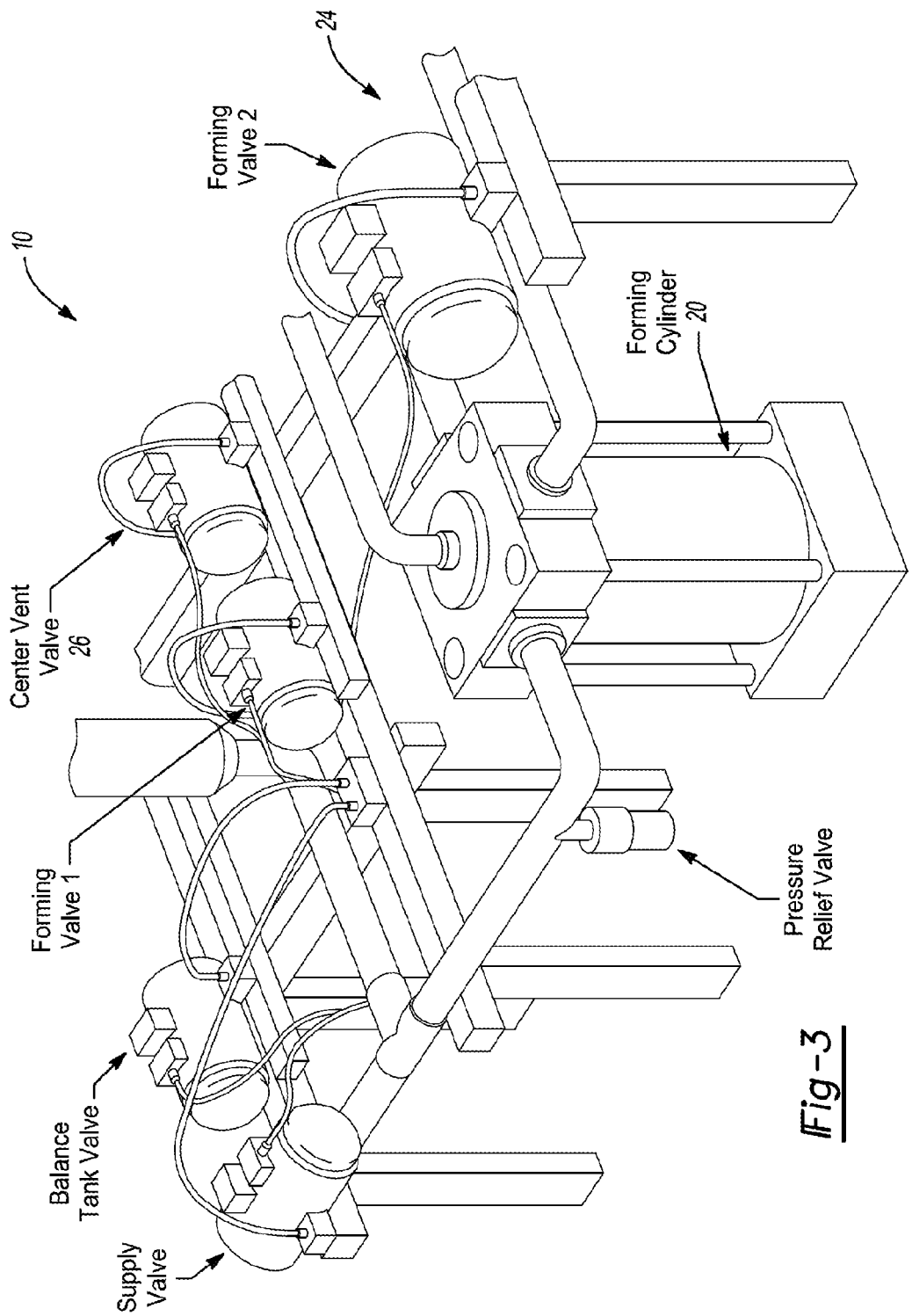
FIG. 3 is a perspective view of the inverted cylinder liquid forming and filling assembly according to the principles of the present teachings with portions removed for clarity.
Figure 4:
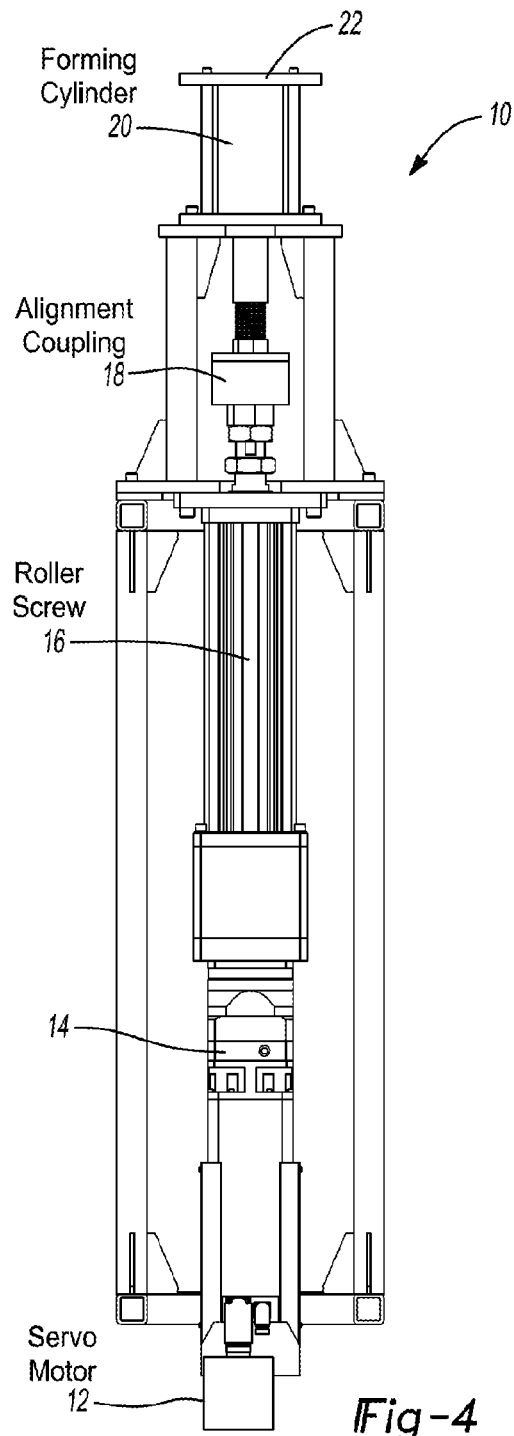
FIG. 4 is a side view of the inverted cylinder liquid forming and filling assembly according to the principles of the present teachings with portions removed for clarity.
Figure 5:
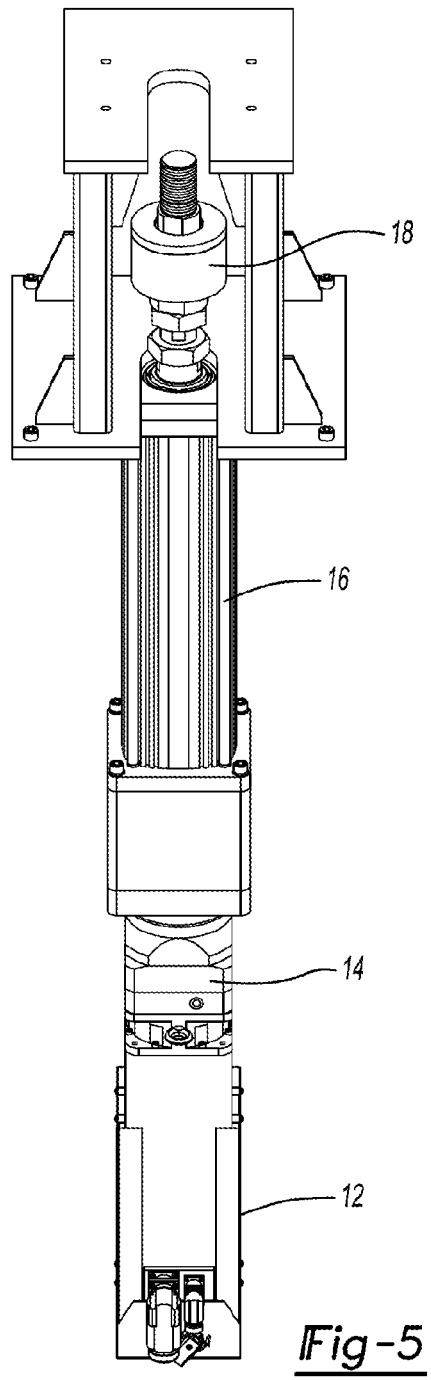
FIG. 5 is a perspective view of the motor, gear box, linear screw, and alignment coupler according to the principles of the present teachings.
Figure 6:
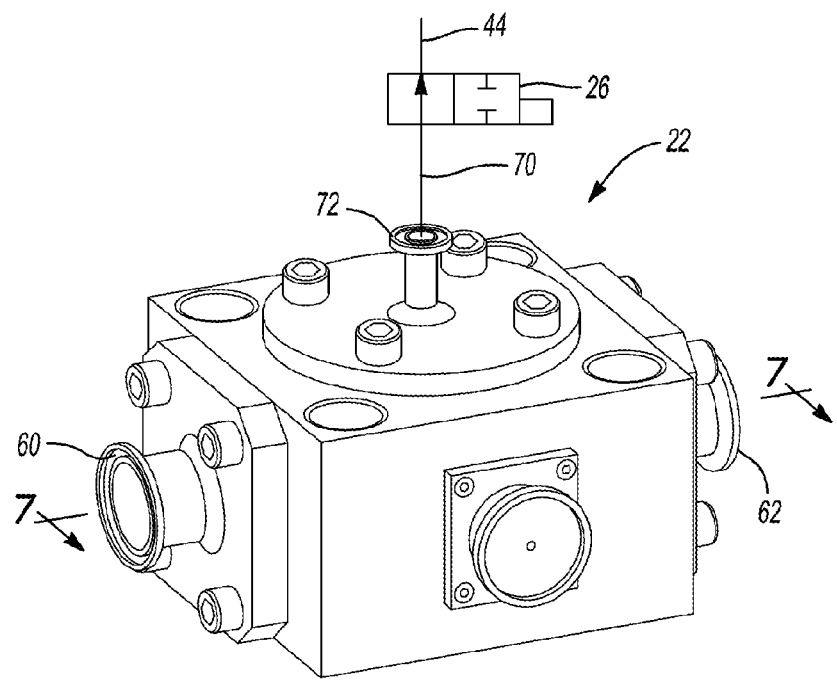
FIG. 6 is a perspective view of a top manifold plate and end cap vent valve assembly according to the principles of the present teachings.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, an inverted cylinder liquid forming and filling assembly 10 is provided for filling liquid into a container under pressure having unique and novel attributes. In some embodiments, the present teachings are directed to an inverted cylinder forming and filling assembly 10 for simultaneously forming and filling plastic containers, such as PET containers for water, beverage, food, and other non-food liquid products.

In some embodiments, inverted cylinder forming and filling assembly 10 can comprise a servo motor 12 for outputting a driving force, a gear box 14 operably coupled to the motor 12 configured to receive the driving output from the motor 12 and outputting a gear box driving force, a linear screw 16 such as a roller or ball screw operably coupled to the gear box 14 configured to produce linear movement in response to rotational movement from the gear box 14, an alignment coupler 18, an inverted forming and filling cylinder 20, a top manifold plate and end cap vent valve assembly 22. This assembly 10 is oriented in a vertical and linear orientation with motor 12 at the bottom and inverted forming and filling cylinder 20 having top manifold plate and end cap vent valve assembly 22 at the top.

As should be appreciated from the figures and discussion herein, forming and filling cylinder 20 is in an "inverted" position meaning the internal piston of forming and filling cylinder 20 pushes the contents upwards to exit the forming and filling cylinder 20 into top manifold plate and end cap vent valve assembly 22 that distributes the contents of forming and filling cylinder 20 to a plastic forming and filling platform system 24 for manufacturing plastic containers.

According to the principles of the present teachings, top manifold plate and end cap vent valve assembly 22 comprises a vent valve 26 attached to a top manifold 28 to allow air to be purged from the system prior to forming and filling a container. That is, when forming and filling cylinder 20 is filled with liquid entrained with air, the air naturally bubbles to the top of forming and filling cylinder 20 and can be efficiently purged from the system through vent valve 26. The timing of the vent valve opening and closing is coordinated with the actuation of forming and filling cylinder 20 and other valves that control the fluid input and output of forming and filling cylinder 20.

With particular reference to FIG. 1, inverted cylinder forming and filling assembly 10 can further comprise a fluidic network 30 for operation thereof. Fluidic network 30 of inverted cylinder forming and filling assembly 10 can comprise a fluid source 32 such as a fluid source, tank, or reservoir for holding a forming fluid therein fluidly coupled to a supply valve 34 via a pump 36. Supply valve 34 is operable between an open position and a closed position. Supply valve 34 is fluidly coupled to an input port 38 of inverted forming and filling cylinder 20 and to a balance tank valve 40. Balance tank valve 40 is fluidly coupled to a balance tank 42 that is operably coupled to a vent line 44 via an air release-valve 46 that is normally open for air to escape and closed when fluid is present.

Inverted forming and filling cylinder 20 can be fluidly coupled to one or more forming cavities, such as forming cavity 48 and a second forming cavity 50, via a first line 51 and an associated first forming valve 52 and a second line 53 and an associated second forming valve 54, respectively. First forming valve 52 and second forming valve 54 can be disposed within top manifold plate and end cap vent valve assembly 22. First forming valve 52 is operable between an open position and a closed position. Similarly, second forming valve 54 is operable between an open position and a closed position. First forming cavity 48 is fluidly coupled to fluid source 32 via a first recirculation valve 56, which is operable between an open position and a closed position. Second forming cavity 50 is fluidly coupled to fluid source 32 via a second recirculation valve 58, which is operable between an open position and a closed position. It should be understood that first cavity 48, second cavity 50, first recirculation valve 56, and second recirculation 58 can be contained within plastic forming and filling platform system 24.

Figure 7:
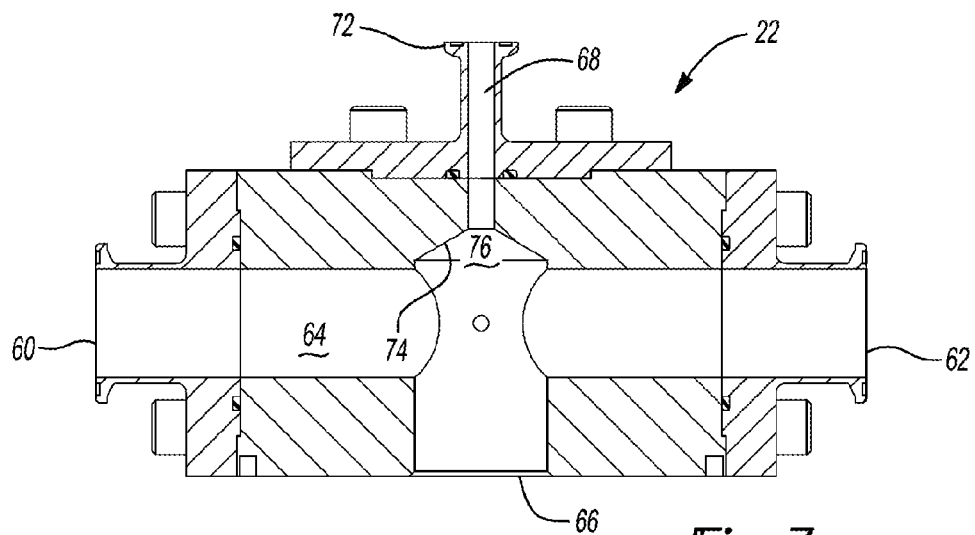
FIG. 7 is a cross-sectional view of the top manifold plate and end cap vent valve assembly according to the principles of the present teachings.

In some embodiments, top manifold plate and end cap vent valve assembly 22 can comprise a first valve outlet 60 operably coupled to first line 51 and a second valve outlet 62 operably coupled to second line 53. In some embodiments, as illustrated in FIG. 7, first valve outlet 60 and second valve outlet 62 can be along a common fluid passageway 64. Fluid passageway 64 can be fluidly coupled to inlet line 66 which is fluidly coupled to an outlet of inverted forming cylinder 20. In this way, pressurized forming liquid from forming cylinder 20 can be passed to first forming cavity 48 via inlet line 66, fluid passageway 64, first valve outlet 60, first line 51, and first forming valve 52. Similarly, pressurized forming liquid from forming cylinder 20 can be passed to second forming cavity 50 via inlet line 66, fluid passageway 64, second valve outlet 62, second line 53, and second forming valve 54.

Top manifold plate and end cap vent valve assembly 22 can comprise a vent passageway 68 fluidly coupled to at least one of inlet line 66 and fluid passageway 64. Vent passageway 68 is disposed vertically above fluid passageway 64 so that air entrapped within the forming fluid is able to naturally rise and be vented via vent passageway 68 to a vent line 70 fluidly coupled to cylinder vent valve 26 and ultimately to vent line 44 that extends to ambient and/or a collection system. Vent passageway 68 can comprise a vent outlet 72 formed for coupling top manifold plate and end cap vent valve assembly 22 to vent line 70.

In some embodiments, the inner surface 74 of fluid passageway 64 and/or vent passageway 68 can have a tapered or radiused surface extending toward vent line 70, which helps to define a collection volume 76 for directing the entrapped air toward vent passageway 68. In some embodiments, inner surface 74 of collection volume 76 can further include diagonal cuts or other features radiating out from the center toward an outside cylinder diameter and incline towards vent passageway 68, thereby directing the entrapped air toward vent passageway 68. It should be understood that vent line 70 and/or vent passageway 68 can be on or off center relative to inlet line 66. In some embodiments, inner surface 74 can comprise an undulating surface directing the entrapped air toward vent passageway 68.

In some embodiments, vent passageway 68 and/or inner surface 74 can comprise a hydrophobic filter and/or coating such as PTFE or DLC (diamond like coating) to prevent the release of forming liquid through vent passageway 68 and allowing air to compress therethrough. Vent passageway 68 can be used as the primary vent to release pressure at the end of the fill cycle to vent the container pressure for more accuracy in final container fill levels. Moreover, vent passageway 68 can be used to vent any trapped air through the system and out the vent valve prior to opening.

It should be understood that the inverted orientation of forming cylinder 20 in accordance with the present teachings permits the overall system height to be reduced compared to conventional systems. This reduced overall height of the system permit fitment of the system within shorter ceiling height areas. Moreover, the present configuration avoids the need to mount and/or coupled servo motor 12 from having to be mounted transverse to the gear box 14, further limiting drive train losses and resulting in improved efficiency.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A liquid forming and filling system for forming and filling a container with a liquid, the liquid forming and filling system comprising:
    a motor;
    a gear box operably coupled to the motor configured to receive a driving output from the motor and outputting a gear box driving force;
    a linear screw operably coupled to the gear box configured to produce linear movement in response to rotational movement from the gear box;
    a forming cylinder configured to output pressurized liquid for forming and filling the container, the forming cylinder being in an inverted orientation;
    a top manifold plate and end cap vent valve assembly coupled to the forming cylinder for receiving the pressurized liquid; and
    a vent valve operably coupled to the top manifold plate and end cap vent valve assembly configured to vent air entrapped within the pressurized liquid.

2. The liquid forming and filling system according to claim 1 wherein the forming cylinder having a piston, the piston configured to push the liquid vertically upward toward the top manifold plate and end cap vent valve assembly.

3. The liquid forming and filling system according to claim 1 wherein the top manifold plate and end cap vent valve assembly comprises:
    an inlet line receiving the pressurized liquid from the forming cylinder;
    an outlet line configured to fluidly couple to a forming cavity;
    a fluid passageway extending between the inlet line and the outlet line; and
    a vent passageway fluidly coupled to the fluid passageway, the vent passageway being further fluidly coupled to the vent valve.

4. The liquid forming and filling system according to claim 3 wherein the top manifold plate and end cap vent valve assembly further comprises:
    an inner surface extending along at least one of the fluid passageway and the vent passageway, the inner surface being configured to direct entrapped air within the liquid toward the vent valve.

5. The liquid forming and filling system according to claim 4 wherein the inner surface is tapered, radiused, or undulating.

6. The liquid forming and filling system according to claim 4 wherein the inner surface has a hydrophobic coating.

7. The liquid forming and filling system according to claim 3 wherein the inlet line is coaxially aligned with the vent passageway.

8. The liquid forming and filling system according to claim 3 wherein the inlet line is coaxially offset relative to the vent passageway.

9. The liquid forming and filling system according to claim 3 wherein the vent passageway has a hydrophobic coating.

10. The liquid forming and filling system according to claim 1, further comprising a hydrophobic filter disposed fluidly coupled with the vent valve.

11. The liquid forming and filling system according to claim 1 wherein the vent valve is positionable between an open position and a closed position.

12. The liquid forming and filling system according to claim 1 wherein the motor, the gear box, the linear screw, the forming cylinder, the top manifold plate and end cap vent valve assembly are linearly and vertically aligned.

13. The liquid forming and filling system according to claim 1 wherein the vent valve is positioned at a highest vertical position above the motor, the gear box, the linear screw, the forming cylinder, the top manifold plate and end cap vent valve assembly.

14. A liquid forming and filling system for forming and filling a container with a liquid, the liquid forming and filling system comprising:
    a motor;
    a gear box operably coupled to the motor configured to receive a driving output from the motor and outputting a gear box driving force;
    a linear screw operably coupled to the gear box configured to produce linear movement in response to rotational movement from the gear box;

a forming cylinder configured to output pressurized liquid for forming and filling the container, the forming cylinder having a piston, the piston configured to push the liquid vertically upward;

a top manifold plate and end cap vent valve assembly coupled to the forming cylinder for receiving the pressurized liquid, the top manifold plate and end cap vent valve assembly having an inlet line receiving the pressurized liquid from the forming cylinder, an outlet line configured to fluidly couple to a forming cavity, a fluid passageway extending between the inlet line and the outlet line, and a vent passageway fluidly coupled to the fluid passageway; and a vent valve operably coupled to vent passageway of the top manifold plate and end cap vent valve assembly configured to vent air entrapped within the pressurized liquid.

15. The liquid forming and filling system according to claim 14 wherein the top manifold plate and end cap vent valve assembly further comprises:

an inner surface extending along at least one of the fluid passageway and the vent passageway, the inner surface being configured to direct entrapped air within the liquid toward the vent valve.

16. The liquid forming and filling system according to claim 15 wherein the inner surface is tapered, radiused, or undulating.

17. The liquid forming and filling system according to claim 14 wherein at least one of the vent passageway and the inner surface has a hydrophobic coating.

18. The liquid forming and filling system according to claim 14 wherein the motor, the gear box, the linear screw, the forming cylinder, the top manifold plate and end cap vent valve assembly are linearly and vertically aligned.

19. The liquid forming and filling system according to claim 14 wherein the vent valve is positioned at a highest vertical position above the motor, the gear box, the linear screw, the forming cylinder, the top manifold plate and end cap vent valve assembly.

* * * * *